March 18, 1958 W. G. PAGDIN 2,827,178

SUCTION GRASPING APPARATUS

Filed May 5, 1955 7 Sheets-Sheet 1

March 18, 1958 W. G. PAGDIN 2,827,178

SUCTION GRASPING APPARATUS

Filed May 5, 1955 7 Sheets-Sheet 5

March 18, 1958 W. G. PAGDIN 2,827,178

SUCTION GRASPING APPARATUS

Filed May 5, 1955 7 Sheets-Sheet 6

March 18, 1958 W. G. PAGDIN 2,827,178

SUCTION GRASPING APPARATUS

Filed May 5, 1955 7 Sheets-Sheet 7

2,827,178
Patented Mar. 18, 1958

2,827,178

SUCTION GRASPING APPARATUS

William G. Pagdin, Little Silver, N. J., assignor to P. Ballantine & Sons, Newark, N. J., a corporation of New Jersey Application May 5, 1955, Serial No. 506,198

14 Claims. (Cl. 212—128)

The present invention relates to apparatus for handling materials or packages and more particularly to such apparatus which is adapted to engage one or more objects by means of suction and shift such objects from one location to another.

In warehouses and other types of installations it has been found advantageous to utilize conveyor systems of one form or another which deliver objects such as packaged merchandise to loading bays where the objects may be grouped or stacked to facilitate further handling. In one type of installation with which the present invention is especially useful, a loading table is provided at the loading bay to which the objects are delivered. A suction head is mounted over the loading table for engaging tiers of objects by means of a partial vacuum or suction. The objects are lifted by the suction head and stacked on pallets adjacent the loading table. While such apparatus has proven to be a marked improvement over the equipment previously available, nevertheless, it has been found that even with active supervision malfunctions resulting in damage to the apparatus have occurred from time to time.

It is, therefore, a principal object of this invention to provide an improved apparatus for shifting and stacking loads capable of trouble free operation with a minimum of supervision.

A more specific object is to provide suction head control means which insure proper operation of suction type lifting apparatus with a minimum of supervision.

Other objects as well as advantages of the present invention will be apparent from the following description and the accompanying drawings in which Figure 1 is a top plan view of a loading bay constructed in accordance with the present invention, the conveyor system which delivers objects to the loading bay having been omitted for convenience;

Figure 1:
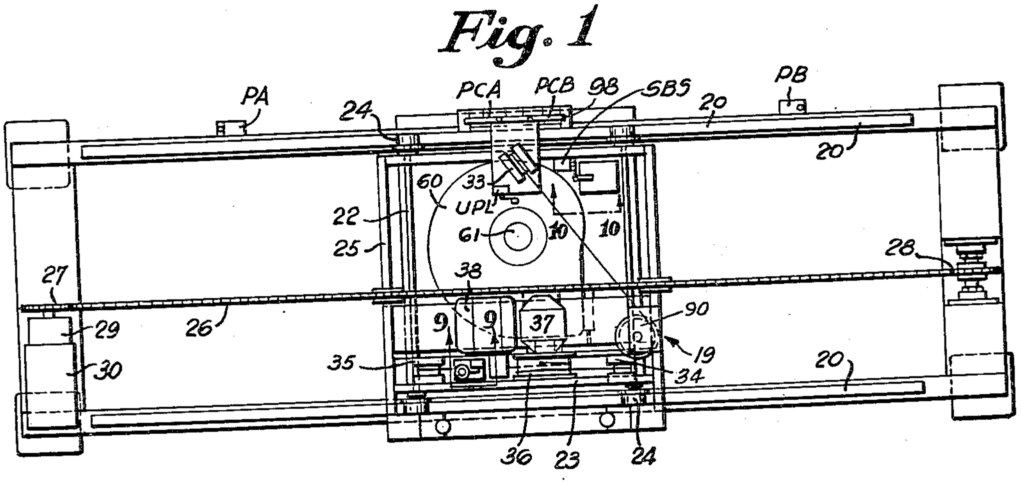
Figures 2, 9:
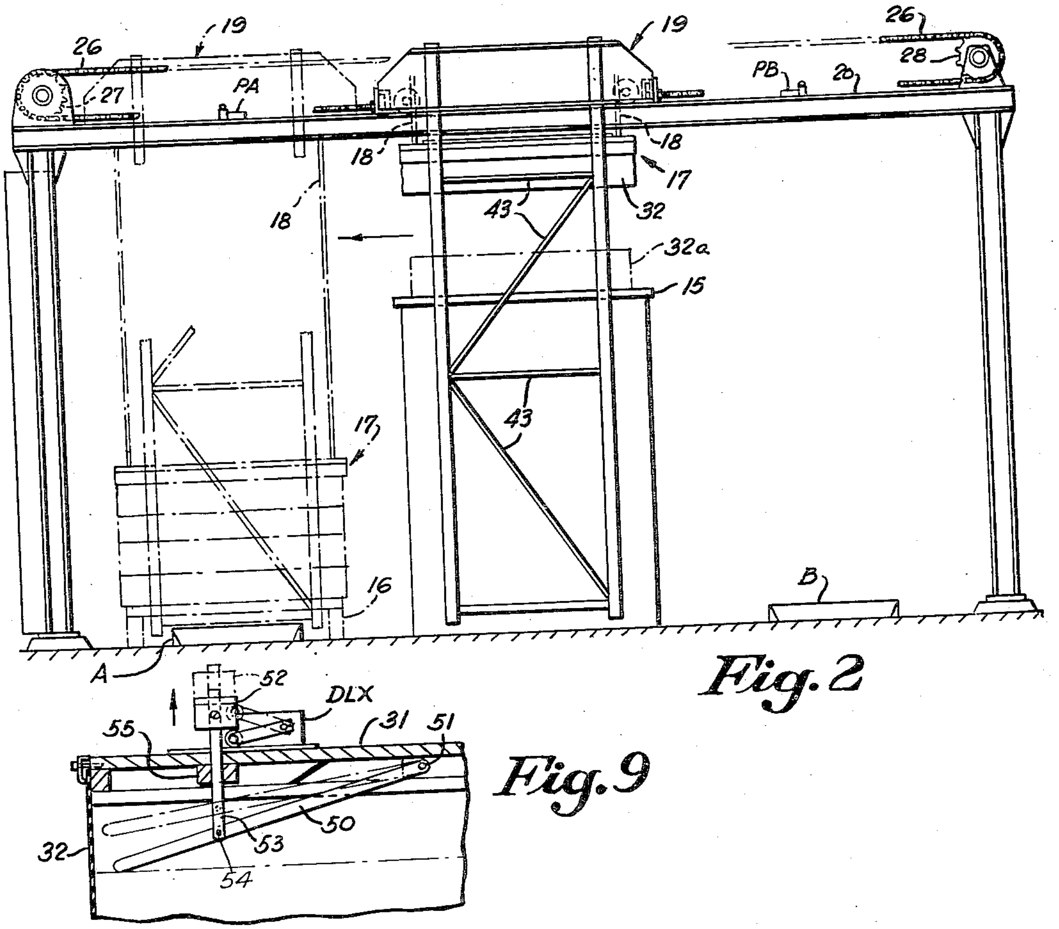
Figure 2 is a front elevational view of the apparatus shown in Figure 1.
Figure 4:
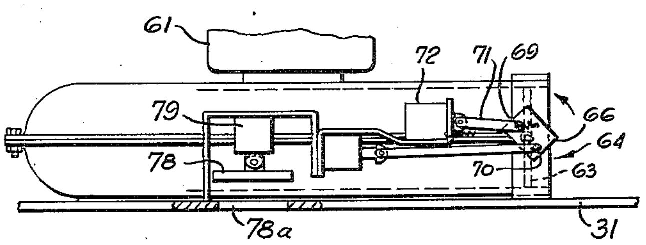
Figure 4 is a front elevational view of the apparatus shown in Figure 3 showing the suction blower valve in its closed position.
Figure 5:
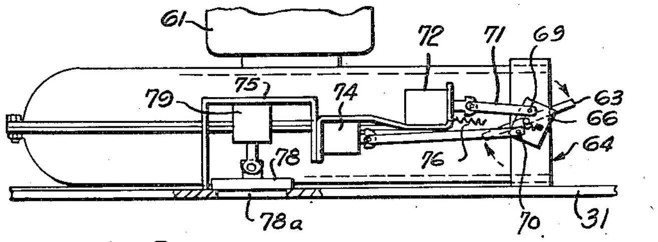
Figure 4A:
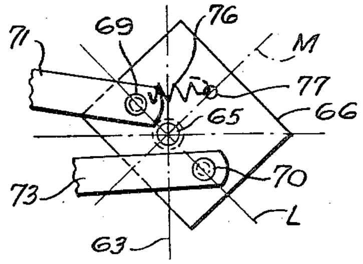
Figure 6:
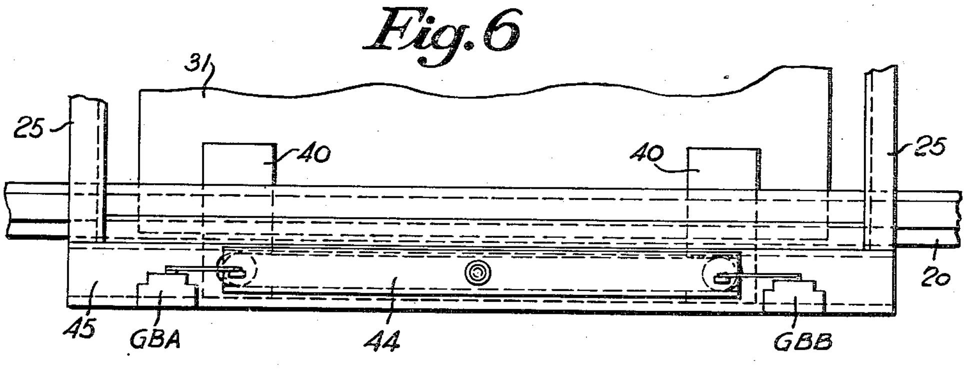
Figure 7:
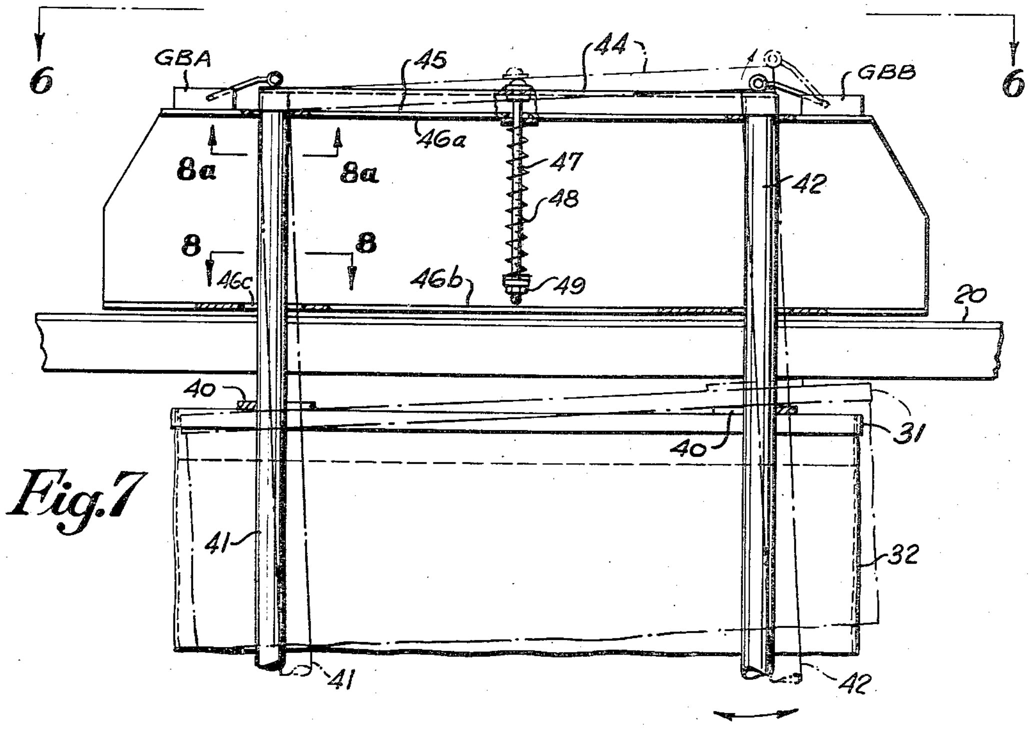
Figure 8:
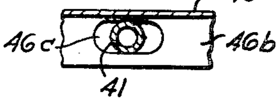
Figure 10:
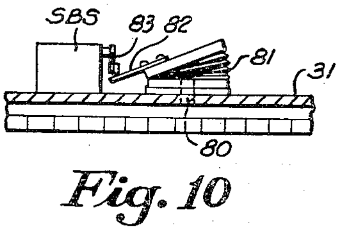
Figure 8A:
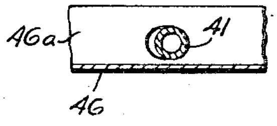
Figure 11:
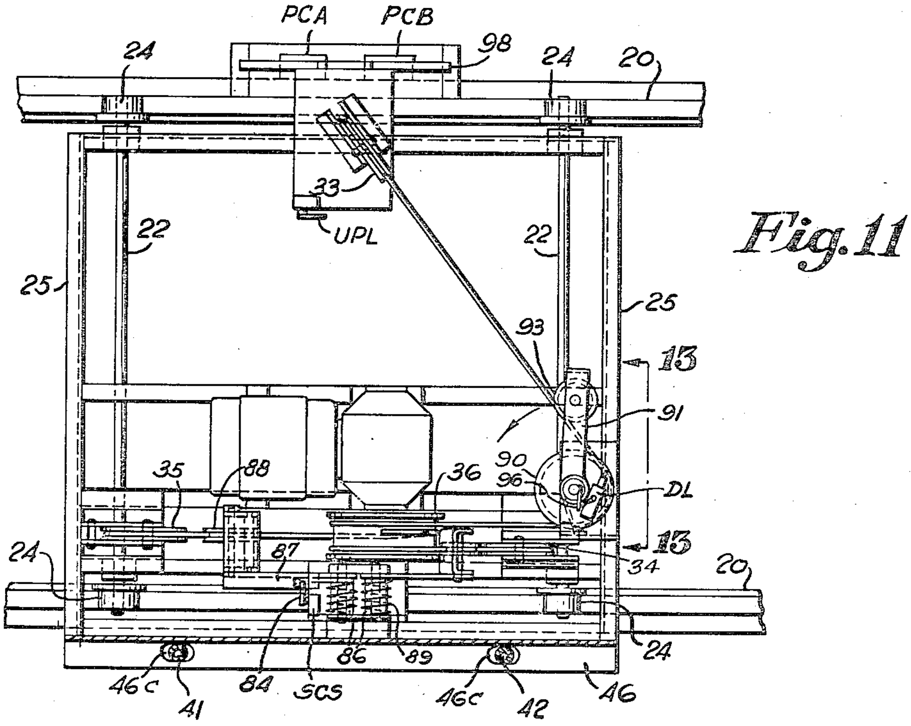
Figures 12, 13:
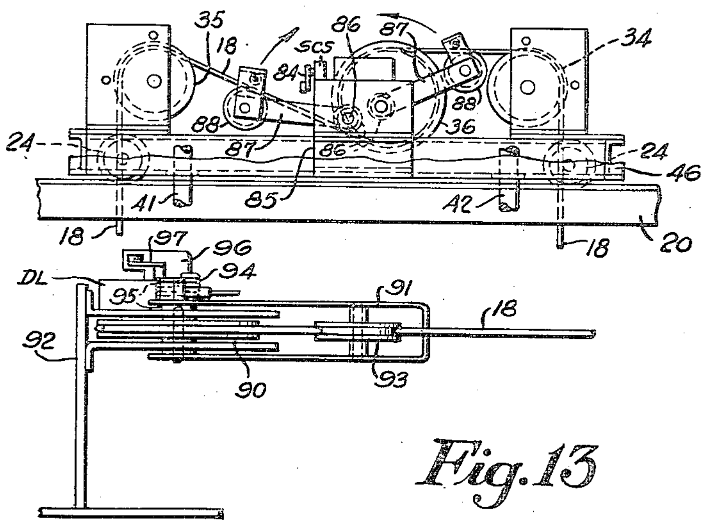
Figure 14:
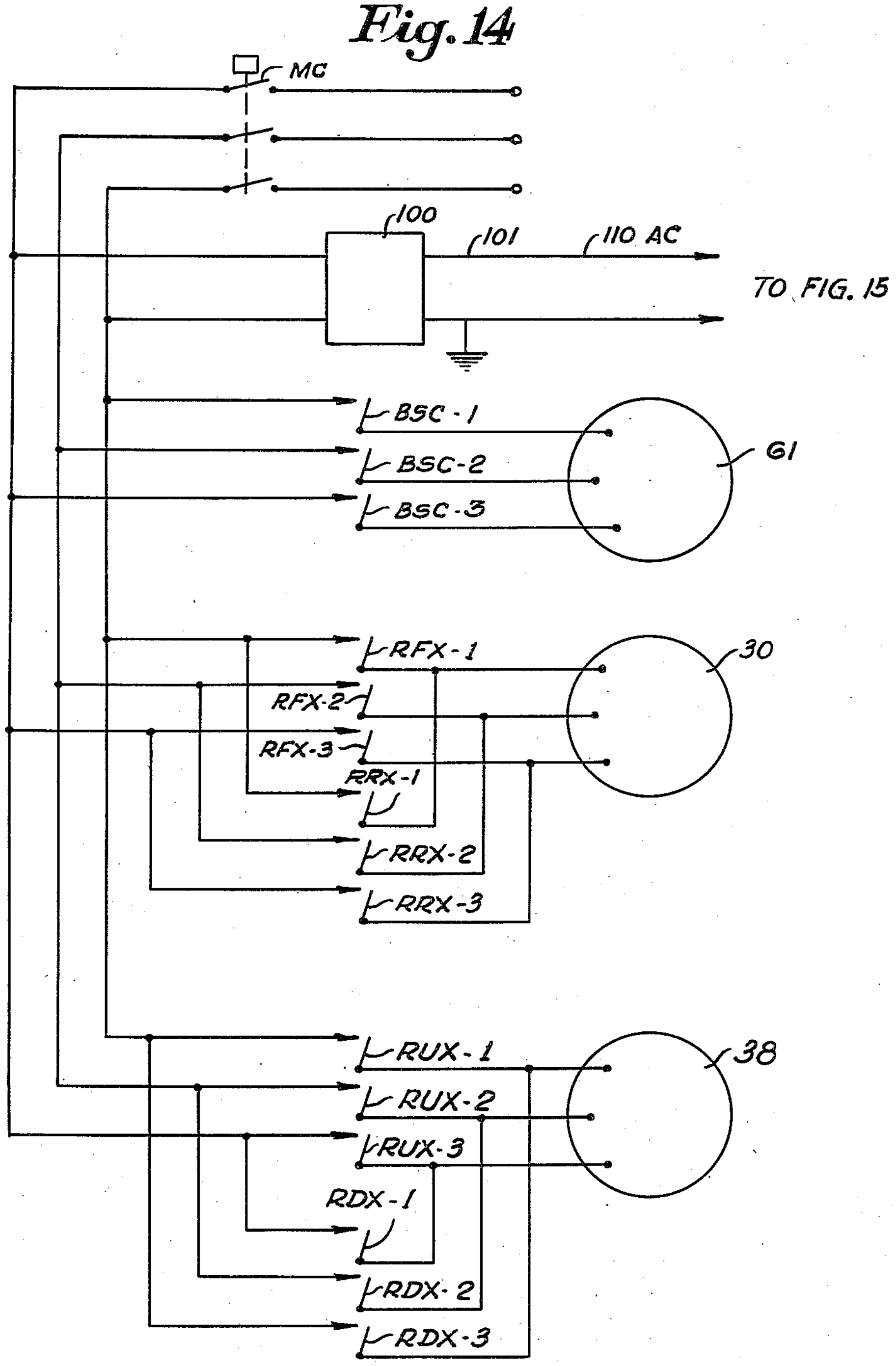
Figure 15:
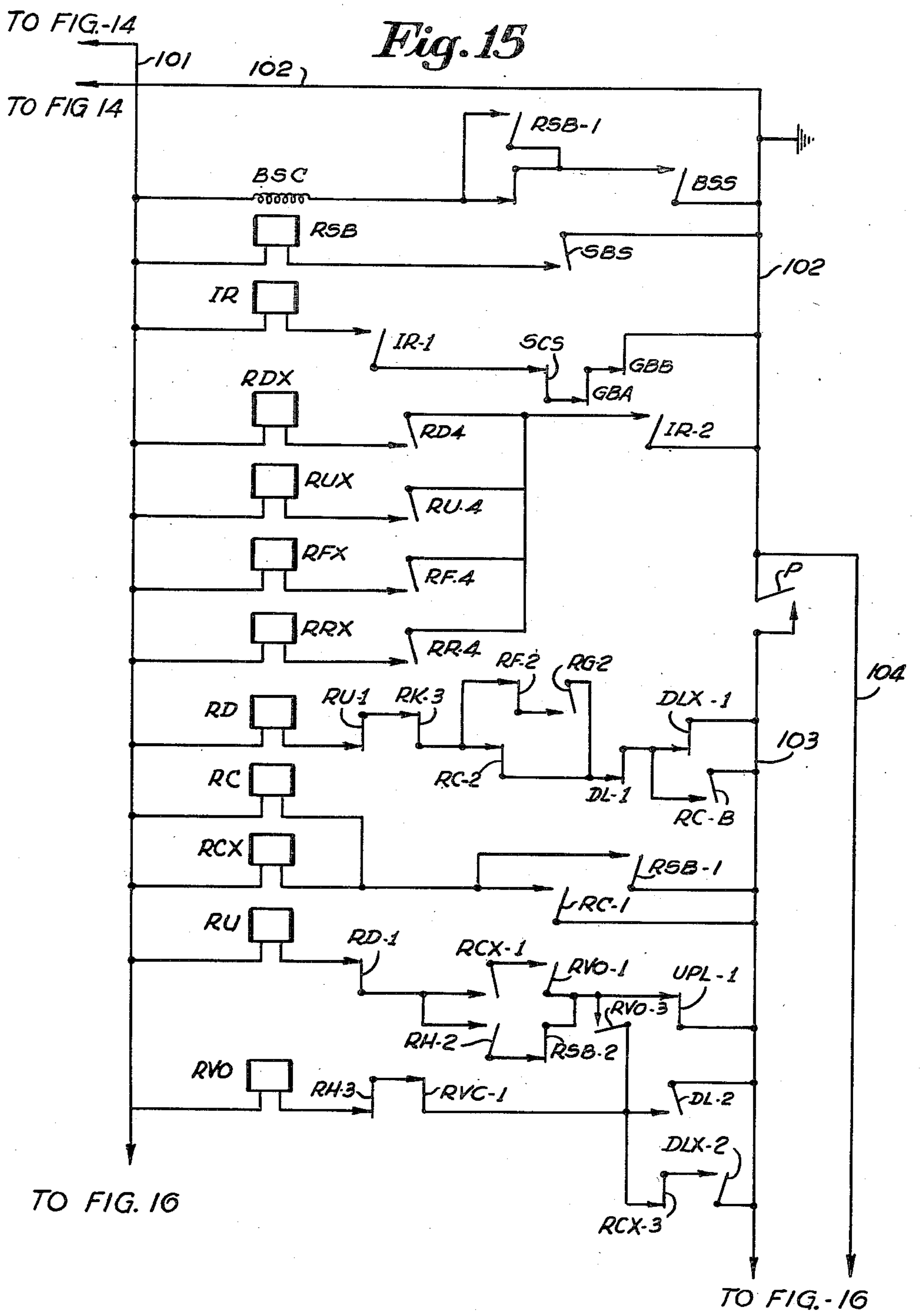
Figure 16:
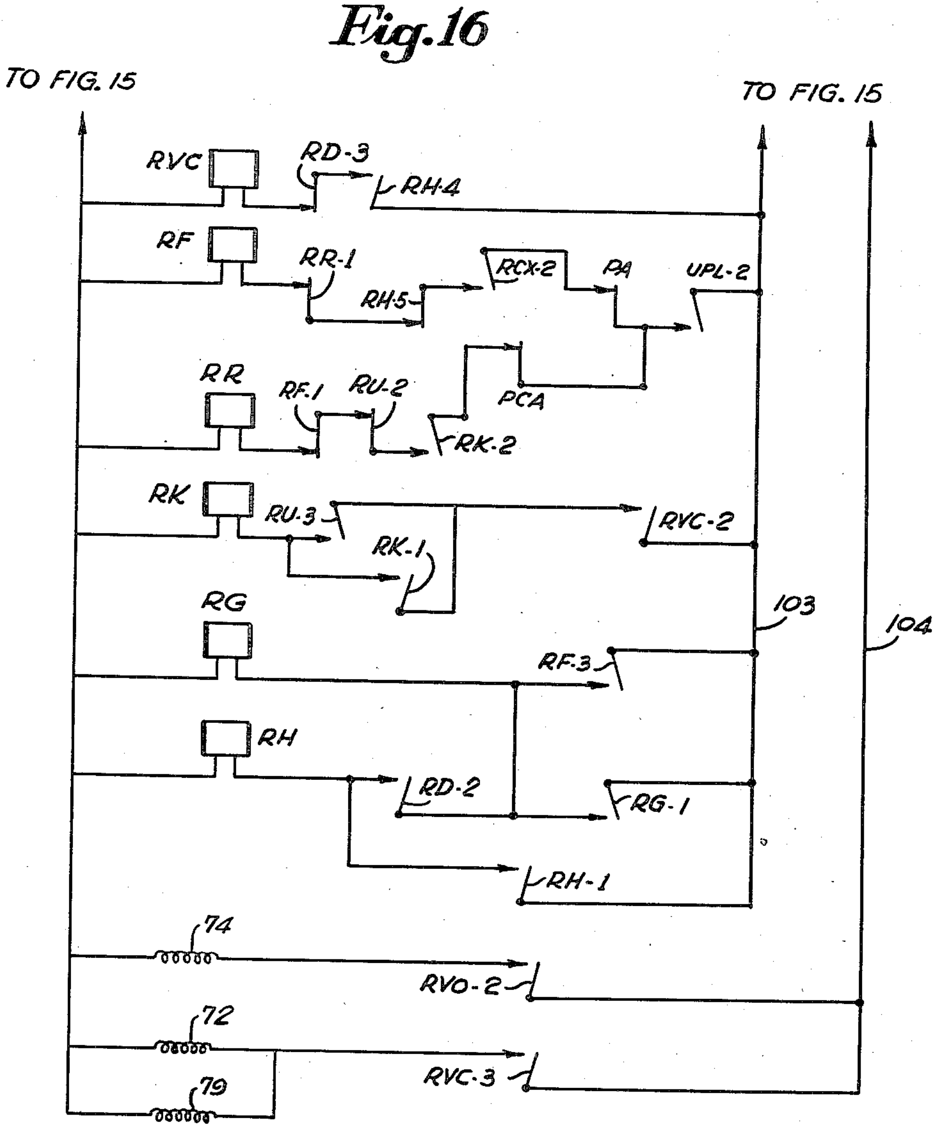

Figure 4*a* is an elevational view on a further enlarged scale of a detail shown in Figure 4;

Figure 5 is a view similar to Figure 4 showing the suction blower valve in its open position;

Figure 6 is a fragmentary top plan view taken from the point of view of the line 6—6 of Figure 7;

Figure 7 is a fragmentary front elevational view on an enlarged scale of the upper portion of the apparatus shown in Figure 2;

Figures 8 and 8*a* are sectional views through the lines 8—8 and 8*a*—8*a* of Figure 7;

Figure 9 is a sectional view along the line 9—9 of Figure 1;

Figure 10 is a fragmentary sectional view through the line 10—10 of Figure 1;

Figure 11 is a top plan view on an enlarged scale of the suction head shown in Figure 1 showing the cable control means;

Figure 12 is a fragmentary front elevational view of the apparatus shown in Figure 11;

Figure 13 is a fragmentary side elevational view thereof taken from the point of view of line 13—13 of Figure 11 in the direction indicated; and Figures 14, 15 and 16 illustrate the circuit arrangement for operation of the suction head control means of the present invention.

Referring now to the drawings and to Figures 1 and 2 in particular, loading table 15 may form part of a loading bay of a roller conveyor system such as is fully set forth in Patent No. 2,716,497 of E. A. Wahl and R. J. Winters, and assigned to the assignee of the present application. Articles to be handled may be removed from pallets 16 and loaded onto the loading table or the articles may be removed from loading table 15 and stacked on the pallets for transshipment or other processing. Means for loading or stacking the articles is provided in the form of a suction head 17 which is connected by cables 18 to a carriage 19 supported on and movable along rails 20. As shown in Figure 2, there may be two pallet stations, designated A and B, one on each side of loading table 15, and rails 20 extend over both pallet stations as well as loading table 15. Axles 22 are rotatably supported by carriage frame members 23 and have wheels 24 fixed thereon which run along rails 20. Each of the side frame members 25 of carriage 19 is connected to opposite ends of a roller link chain 26 which is in engagement with sprockets 27, 28. Sprocket 27 is fixed to the output shaft of reduction gear box 29 which is in turn driven by reversible carriage motor 30. Operation of motor 30 serves to drive carriage 19 as well as suction head 17 suspended therefrom to the right or left as viewed in Figures 1 and 2. In Figure 2 suction head 17 is shown in full lines in position over loading table 15 and in broken lines lowered to operating position over pallet station A where several tiers of objects are indicated on pallet 16.

Suction head 17 comprises a platform or header member 31 from the periphery of which there is suspended a flexible curtain or apron 32. Cables 18, of which there may be three, are fixed to header member 31 and extend upward over pulleys 33, 34 and 35 carried on carriage 19 to drum 36 which is in turn fixed to the output shaft of reduction gear box 37. Reversible hoist motor 38 is also carried on carriage 19 and is connected to the input side of gear box 37. Operation of hoist motor 38 in one direction serves to pay out cables 18 to lower header member 31. Operation of motor 38 in the opposite direction serves to raise header member 31.

Referring now to Figures 6, 7, 8 and 8*a*, header member 31 carries two guide brackets 40 having U-shaped openings formed therein in each of which vertical guide members 41, 42, respectively, extend. Vertical guide members 41, 42 are rigidly interconnected by braces 43 and adjacent their upper ends are joined by connector 44 which normally seats on channel member 45. Carriage 19 carries an upwardly extending flanged support member 46, the upper flange of which serves to support channel member 45. At about the midpoint of connector 44, an elongated stud 47 is fixed thereto and extends downwardly and passes freely through aligned holes formed in channel member 45 and support member 46. A spring 48 has one end thereof bearing against nut 49 on stud 47 while its opposite or upper end bears against the under surface of the upper flange 46*a* of member 46. Except as limited by spring 48, connector 44 and guide members 41, 42 connected thereto are free to move upwardly to a limited extent. As most clearly shown in Figures 6 and 7, normally closed guide bar switches GBA and GBB are each mounted on channel member 45 adjacent opposite ends of connector 44. Switch GBA has its arm in engagement with connector 44 adjacent to vertical guide member 41. Switch GBB has its arm in engagement with connector 44 adjacent to vertical guide member 41. As shown schematically in Figure 15, switches GBA and GBB are interposed in the circuit so that opening of either switch interrupts current to carriage motor 30 and hoist motor 38 thereby to stop both horizontal and vertical movement of suction head 17. As indicated in dot and dashed lines in Figure 7, if suction head 17, while being raised should become tilted for any reason and bind with vertical guide members 41 or 42, one or the other of the guide members is carried up thereby raising the corresponding end of connector 44 and compressing spring 48. As indicated, guide member 42 has been raised permitting rotation of the arm of switch GBB which opens its contacts. Similarly, if suction head 17 becomes tilted in the opposite sense so as to raise guide member 41, switch GBA is actuated to open its contacts. It will be apparent that anything which causes both guide members 41, 42 to be raised together will result in raising of connector 44 and actuation of both switches GBA, GBB and consequent interruption of power to hoist motor 38. In the event either of the guide bars 41, 42 should come up against an obstruction while carriage 19 is in motion, the consequent tilting of guide bars 41, 42 serves to open one of the switches GBA or GBB thereby to interrupt operation of carriage motor 30. As shown most clearly in Figure 8, the lower flange **46*b* of support member 46 has ellipsoidal holes 46*c* formed therein permitting guide members 41, 42 to swing laterally. While the holes formed in the upper flange 46*a* are also ellipsoidal to permit lateral rotation of guide members 41, 42, the distance between these holes corresponds to the distance between members 41 and 42 so that flange 46*a* serves to locate members 41 and 42**.

As previously indicated, operation of hoist motor 38 in one direction serves to pay out cables 18 and lower suction head 17. Assuming suction head 17 to be unloaded, elongated actuator bar 50 (Figure 9) pivotally connected to header 31 at 51, is in its downward position due to counterweight 52 carried above header member 31 on rod 53, the latter being connected to the actuator bar at pivot 54. Rod 53 extends upwardly through an opening in header member 31 sealed by packing 55. Down limit switch DLX is mounted on the upper side of header member 31 and has its spring biased arm engaged under counterweight 52. The arm of switch DLX is biased to rotate clockwise (as shown) to actuate the switch as counterweight 52 is raised. The long and inclined expanse of actuator bar 50 exposed below header member 31 insures positive operation of switch DLX while permitting a relatively wide tolerance both in the positioning of suction head 17 relative to the articles to be engaged thereby and the shape or condition of the articles. Thus, where cartons are being handled, apertures or holes in the upper surface thereof into which a rod such as rod 53 might enter would not prevent actuation of switch DLX by bar 50. Furthermore, even if a carton were located with its edge inwardly of pivot 54, actuator bar 50 would "find" the carton and actuate switch DLX in time to arrest downward movement of suction head 17 before it collides with the cartons or objects to be grasped by the head. As shown in the schematic diagram of Figure 15, switch DLX has normally closed contacts DLX–1 included in the hoist motor control circuit, and normally open contacts DLX–2 included in the blower valve control circuit. The operation of these contacts will be described in greater detail.

Figure 3:
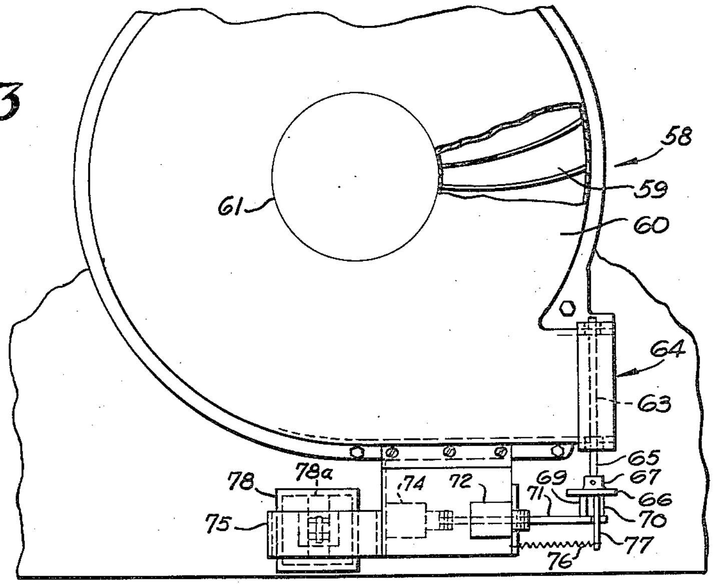
Figure 3 is a fragmentary top plan view of the suction head shown in Figure 1.

Turning once again to Figure 1 and to Figures 3, 4 and 5, there is centrally mounted on the upwardly presented surface of header member 31 a blower 58 comprising a fan 59 encased in housing 60 and coupled with the shaft of blower motor 61, the latter extending above housing 60. The interior of blower housing 60 communicates with the area enclosed by apron 32 through a centrally located opening formed in header member 31. Valve 63 is mounted in discharge opening 64 of blower housing 60 and is in the form of a disc fixed on a shaft 65 journaled through the walls of the housing. A plate member 66 has a hub 67 fixed thereto by means of which it is secured to one end of shaft 65. Valve 63 rotates with shaft 65 and is disposed vertically when in its closed position as shown in Figure 4. A pair of studs 69, 70 is mounted on the outer surface of plate member 66 to form a straight line L preferably extending about 45° with respect to the closed position of valve 63. Link 71 at one end thereof is pivotally connected to stud 69 and adjacent its other end is connected to valve closing solenoid 72. A second link 73 is similarly connected between stud 70 and valve opening solenoid 74. Links 71 and 73 are disposed in substantially the same vertical plane so that the rotational forces transmitted to shaft 65 by solenoids 72 and 74 are applied in a direction which is normal to the axis of shaft 65. Solenoids 72 and 74 are conveniently supported from a bracket member 75 which is fixed to the upper surface of header member 31. Bracket member 75 also serves to anchor one end of spring 76, the other end of which is fixed to stud 77 carried on plate member 66. As shown most clearly in Figure 4*a*, line M joining stud 77 with the axis of shaft 65 extends normal to line L with the various parts arranged as shown. The throw of solenoid 72 or 74 is such that in the closed position of valve 63 stud 77 is above the plane extending through the axis of shaft 65 and the end of spring 76 anchored to the support bracket. When solenoid 74 is actuated to draw link 73 to the left as shown in Figure 5, stud 77 travels through an arc which carries it below said plane. Consequently, spring 76 serves to maintain valve 63 in either its open or closed position as the case may be following energization of either solenoid 72 or 74 thereby rendering valve 63 independent of a circuit failure which prematurely deenergizes the solenoids. The importance of this mode of operation of valve 63 will be more fully pointed out hereinbelow.

Header member 31 has a vent **78*a* formed therethrough which when open permits the area under the suction head to communicate with the atmosphere. Vent valve 78 is connected to and actuated by solenoid 79, the latter being mounted on bracket 75. As shown in Figure 16, solenoid 79 is connected in parallel with solenoid 72 and is also energized when contacts RVC–3 are closed. When energized, solenoid 79 lifts vent valve 78 to open vent 78*a*. This serves to break the suction under header member 31 rapidly. It is to be noted that if solenoid 79 is deenergized, vent valve 78 remains in its closed position so that in the event of a current failure, valve 78*a*** is closed.

When a tier of packages is in position to be grasped by suction head 17 contacts P (Figure 15) are closed due to the operation of apparatus which forms no part of the present invention but which is fully set forth and described in said copending application. As will be more fully pointed out, hoist motor 38 is then energized to lower the suction head. Downward movement of suction head 17 is arrested upon actuation of actuator bar 50 in time to bring the suction head to a stop or substantially slow its movement before it reaches the tier of packages to be grasped by the head. During the foregoing sequence, blower motor 61 is in continuous operation but due to valve 63 being in its closed position, the blower is ineffective and draws substantially no air from below the suction head. Following actuation of switch DLX–1 and termination of the downward movement of suction head 17, solenoid 74 is energized to open discharge opening 64 of blower housing 60. Air is sucked from under suction head 17 at such a rate that the pressure differential across flexible apron 32 causes the same to collapse around the cartons thereby permitting suction head 17 to firmly grasp the packages by means of the partial vacuum thus created. As shown most clearly in Figure 10, header member 31 has an aperture 80 formed therethrough and carries a collapsible bellows 81, the interior of which communicates with the area under the header through aperture 80. A lever 82 is fixed to the free end wall of bellows 81 and extends under the downwardly biased arm 83 of suction bellows switch SBS. Bellows 81 is so constructed and may be so spring biased that it is collapsible under the weight of arm 83 only when a sufficiently high pressure differential is present between the atmosphere and the area under suction head 17 to insure safe lifting of the objects grasped by the suction head. Operation of switch SBS is followed by energization of hoist motor 38 to wind up cables 18 and thereby raise suction head 17 so that the assembly may be shifted to the position where the objects grasped by the suction head are to be disposed.

It is important to avoid the occurrence of slack in cables 18 because excessive slack accumulating above suction head 17 or about carriage 19 may result in fouling of the cables and substantial damage to the apparatus. Consequently, as now will be described, means are provided for taking up the slack in cables 18 which may occur during normal operation and also to deenergize all but the suction blower motor 30 should excessive slack occur.

As was indicated, cables 18 are connected to common drum 36 and each extends over one of the pulleys 33, 34 and 35 providing a three-point connection to header member 31. Turning now to Figures 11, 12 and 13, adjacent to and in front of drum 36, there is secured to carriage 19, a support bracket 85 to which are fixed two studs 86. A pair of slack take-up arms 87 is provided, one being rotatably mounted on each of the studs 86. Adjacent to its free end, each of the arms 87 carries a roller 88 positioned below and in engagement with the cables 18 which extend between drum 36 and pulleys 34, 35 respectively. Relatively stiff springs 89 are each mounted about one of the studs 86 and serve to bias arms 87 upwardly to maintain the associated cable 18 taut. Also mounted on support bracket 85, is normally closed slack cable switch SCS whose arm 84 extends into the path of one of the slack take-up arms 87. Switch arm 84 is located relative to the normal cable position of slack take-up arm 87 so that the take-up arm may swing through an arc before engaging switch arm 84. The operation of switch SCS will be more fully described, however, it may be here noted that when opened, switch SCS opens the main safety control circuit to prevent operation of both the hoist and carriage motors. If desired, a second switch SCS may be mounted on support bracket 85 for actuation by the right-hand slack take-up arm 87, Figure 12.

The third cable 18 extending between drum 36 and pulley 33, passes about a horizontally disposed pulley 90 rotatably mounted on carriage 19. Third slack take-up arm 91 is U-shaped and mounted for rotation about the axis of pulley 90. Support 92 which serves to support pulley 90 on carriage 19 conveniently also serves as a support for slack take-up arm 91. A roller 93 is mounted adjacent the free end of slack take-up arm 91 and is positioned for engagement with the cable between pulleys 33 and 90. A relatively stiff spring 94 is mounted about tubular member 95 which in turn is fixed on slack take-up arm 91 coaxially with the shaft of pulley 90. On the upwardly disposed free end of tubular member 95, there is mounted plate-like actuator member 96 against which spring biased arm 97 of down limit switch DL bears. Down limit switch DL has normally closed contacts DL–1 and normally open contacts DL–2. While slack take-up arm 91, due to the action of spring 94, normally maintains cable 18 taut, a predetermined rotation of arm 91 causes a similar rotation of tubular members 95 and actuator member 96 which in turn rotates arm 97 to actuate switch DL. It is to be noted that the arc through which plate-like actuator member 96 rotates before actuating down limit switch DL is small compared to the free travel of the slack take-up arm 87 associated with slack cable switch SCS. Operation of switch DL due to counterclockwise rotation of take-up arm 91 (Figure 11) serves to deenergize hoist motor 38 as will be more fully pointed out, and, since this occurs before actuation of switch SCS by arm 87, switch SCS is not actuated unless drum 36 continues to pay out cable after actuation of switch DL–1.

It should also be noted that spring biased slack take-up arms 87 and 91 actually function to prevent the appearance of any slack in cables 18 thereby eliminating jerking of the suction head when hoist motor 38 is actuated to raise the same.

Carriage 19 carries up limit switch UPL having normally closed contacts UPL–1 (Figure 15) which are held open when suction head 17 is in its raised position, switch UPL being engaged by an upwardly extending cam (not shown) projecting above header member. Switch UPL also includes normally open contacts UPL–2 which, as will be pointed out, control operation of carriage motor 30. The operation of carriage motor 30 is further controlled by means of switches PA and PB located respectively above pallet stations A and B and switches PCA and PCB located above loading table 15 at about the center of the travel of carriage 19 along rails 20. For purposes of simplification switches PB and PCB are shown only in Figures 1 and 2 and are omitted from Figures 15 and 16. Switches PA, PCA, PCB and PB are conveniently supported adjacent one of the rails 20 as shown and are actuated by a cam 98 connected to carriage 19.

Turning now to the schematic diagram of Figures 14, 15 and 16, the operation of the suction head and carriage control means will now be set forth. For convenience in interpretation of the drawing, the contacts associated with the various relays and limit switches have been included at the points in the circuit wherein they operate rather than adjacent the relay coils or switches. The contacts are designated with the same reference letter or letters employed for the associated relay coil or switch, and the different contacts associated with the same relay coil or switch have been provided with additional numerals to differentiate one from the other. For convenience it may be assumed that the apparatus of this application is being utilized in conjunction with automatic apparatus of the type set forth in said copending application for palletizing or depalletizing tiers of packages. However, it is evident that the present apparatus may be utilized semi-automatically and may be manually set in operation whenever a tier of packages is in position to be grasped by suction head 17.

At the start of operation, ganged switch MC interposed in the conductors connecting motors 30, 38 and 61 to the source of electromotive power, is closed. Blower starter coil BSC and interlock relay IR are each connected, through various contacts, across the 110 volt A. C. power supply indicated at 100, Figure 14, conductor 101 being connected to one side of each, and conductor 102 being connected to the opposite side through the contacts shown. For convenience, all of the relays and solenoids are shown with one side thereof connected to conductor 101. As part of the start-up operation the following additional steps are carried out: the suction blower starter switch BSS is closed to energize coil BSC thereby closing contacts BSC–1, 2 and 3 to energize blower motor 61; contacts IR–1 are closed to pick up interlock relay IR, switches SCS, GBA and GBB being normally closed.

With the apparatus as shown in solid lines in Figure 2 and the tier of packages 32*a* in position on loading table 15, switch P which serves to connect conductor 103 with conductor 102, is closed to pick up relay RD, the latter being energized through normally closed series contacts, RU–1, RK–3, RC–2, DL–1 and DLX–1. Contacts DL–1 and DLX–1 remain closed at this time signifying that the suction head is empty, actuator bar 50 being in its down position, and cable 18 extending in a straight line between pulleys 33 and 90 leaving switch DL adjacent slack cable take-up arm 91 unactuated. Auxiliary down, up, forward and reverse relays RDX, RUX, RFX and RRX, respectively, are each conected in series with normally open contacts IR–2 now closed since relay IR is energized. Upon closing of contacts RD4, relay RDX now picks up, closing its normally open contacts RDX–1, 2 and 3 and energizing hoist motor 38 to pay out cables 18 and lower suction head 17.

As previously described, actuator bar 50 engages tiers 32*a* as suction head 17 approaches the same thereby to actuate down limit switch DLX. Contacts DLX–1 now open to deenergize relay RD (contacts RC–3 being open), opening contacts RD–4 and contacts RDX–1, 2 and 3 to deenergize hoist motor 38.

At the same time contacts DLX–2 of the down limit switch DLX are closed to complete the circuit to the suction valve opening relay RVO through normally closed contacts RH–3, RVC–1 and RCX–3. Relay RVO locks in through closing of its contacts RVO–3 connected to one side of normally closed contacts UPL–1 until suction head 17 is once again raised to open contacts UPL–1. Closing of contacts RVO–2 energizes suction valve opening solenoid 74 which serves to position valve 63 as shown in Figure 5. It is to be noted that at this time solenoid 72, as well as solenoid 79, is deenergized so that vent valve 78 is closed.

When sufficient suction or vacuum is developed under suction head 17 to safely lift the tier of packages, bellows 81 collapses sufficiently far to actuate suction bellows switch SBS and energize the suction bellows relay RSB. The contacts operated by relay RBS are now actuated to start the up motion of hoist motor 38. This follows the closing of contacts RSB–1 which serve to energize relays RC and RCX which lock up through the closing of contacts RC–1 in parallel with contacts RSB–1. It will be noted that contacts RCX–3 are now open to cut out contacts DLX–2 and relay RVO is maintained energized through contacts RVO–3 and UPL–1. The up motion control relay RU is now energized through contacts RD–1 (relay RD now deenergized) RCX–1, RVO–1 and normally closed contacts UPL–1 of up limit switch UPL. At the same time relay RD is locked out due to the opening of contacts RC–2 and RU–1 in that sequence. Relay RUX picks up on the closing of contacts RU–4 to close its contacts RUX–1, 2 and 3 to energize hoist motor 38 and raise suction head 17. As suction head 17 reaches its raised position its cam engages up limit switch UPL thereby opening its contacts UPL–1 to deenergize relay RU which in turn causes relay RUX to drop out through opening of contacts RU–4. Hoist motor 38 is now also deenergized due to opening of contacts RUX–1, 2 and 3.

Upon actuation of up limit switch UPL, contacts UPL–2 are closed which completes the circuit to carriage motor control relay RF through normally closed series contacts RR–1, RH–5 now closed contacts RCX–2 (relay RCX energized) and switch PA. Relay RF having picked up, contacts RF–4 are now closed thereby energizing relay RFX to close its contacts RFX–1, 2 and 3 and energize carriage motor 30 to propel carriage 19 to pallet station A. Relay RG picks up through now closed contacts RF–3 and locks in through its contacts RG–1. It may be noted that the closing of contacts RG–2 in series with down motion control relay RD leaves this relay still deenergized since both contacts RF–2 and RC–2 (in parallel with RF–2 and RG–2) are now open (relays RF and RC being energized). As carriage 19 arrives in position at pallet station A cam 98 engages switch PA to open the same dropping out relay RF which, by opening its contacts RF–4, causes relay RFX to drop out and thereby, on opening its contacts RF–1, 2 and 3 deenergize carriage motor 30.

Following deenergization of relay RF, down motion control relay RD picks up through contacts RF–2 to again energize relay RDX and thereby energize hoist motor 38 to lower suction head 17. When the tier of packages grasped by suction head 17 engages the pallet or a previously positioned tier down limit switch DL is actuated, opening its contacts DL–1 to drop out relay RD and the down motion is arrested. Relay RG having previously picked up, closing of contacts RD–2 at this time picks up relay RH connected through series contacts RD–2 and RG–1 to conductor 103. Contacts RH–3 in series with valve open relay RVO open to lock out relay RVO even though contacts DL–2 are now closed. Relay RH locks in through its now closed contacts RH–1 bridging contacts RD–2 and RG–1. Valve closing relay RVC is connected to conductor 103 through normally closed contacts RD–3 and normally open contacts RH–4 and closing of the latter serves to energize relay RVC (relay RD deenergized). Contacts RVC–3 now close to energize both solenoids 72 and 79. Valve 63 is closed as shown in Figure 4 and vent valve 78 is open thereby releasing the tier from the suction head.

The simultaneous closing of valve 63 and opening of vent valve 78 provides rapid breaking of the suction holding the packages under suction head 17. Consequently the up motion may be initiated without delay without any danger of the packages being raised some distance and then dropped. Relay RU is now energized through normally closed contacts RD–1 (relay RD deenergized) now closed contacts RCX–1, RVO–1, and normally closed contacts UPL–1. As before, contacts RU–4 now close to energize relay RUX which in turn close contacts RUX–1, 2 and 3 to energize hoist motor 38 and raise suction head 17.

Relay RK, connected in series with normally open contacts RU–3 and RVC–2 picks up with the closing of contacts RU–3 (relay RVC being energized). Contacts RK–1 bridge contacts RU–3 and close to lock in relay RK. Up limit switch UPL is actuated as the suction head reaches the top of its travel, opening its contacts UPL–1 to deenergize relay RU which, through opening of its contacts RU–4 deenergizes hoist motor 38. Relay RK remaining energized at this time, contacts RK–2 are closed and actuation of up limit switch UPL to close its contacts UPL–2 energizes relay RR, relays RF and RU being deenergized and their contacts RF–1 and RU–2 respectively being in their closed position. Since carriage 19 is not in its center position over loading table 15 switch PCA is also closed. Relay RRX is now energized through now closed contacts RR–4 thereby closing its contacts RRX–1, 2 and 3 to energize carriage motor 30. Carriage 19 is driven back toward its position over loading table 15 where switch PCA is engaged by cam 98 and opened. Opening of switch PCA deenergizes relay RR. Switch P connecting conductors 102 and 103 is now opened to drop out relays RG and RH and the apparatus is again in condition for operation as has been described.

It will be evident that the contacts as well as certain interlocks necessary for operation of the apparatus to pallet station B have been omitted. Also certain control elements necessary for depalletizing have not been shown or described. Such features are not part of the present invention and are described and claimed in said copending application.

Valve opening solenoid 74 in series with contacts RVO–2 and solenoids 72 and 79 in series with contacts RVC–3 are each connected through their respective series contacts to conductor 104 which is in turn connected to conductor 102 on the grounded side of switch P. Consequently, operation of switch P does not directly affect those solenoids. In any event, the construction of valve 63 and spring 76 is such that interruption of current to either solenoid 72 or 74 is not effective to shift the position of valve 63 which remains in place unless one of the solenoids is energized to operate it. It will also be apparent that even through relay RVO is deenergized while suction head 17 is still grasping and carrying a load and solenoid 74 is thereby dropped out, valve 63 remains open.

By locating valve 63 in the discharge opening of blower housing 60, positive control of the suction under header member 31 is obtained. It is also advantageous in facilitating mounting of the blower directly on the suction head thereby eliminating the necessity for elaborate conduits and permitting substantially direct communication between the blower and the area under the suction head through the opening in header member 31. When valve 63 is closed, a condition is substantially immediately reached which is termed the cut-off point evidenced by reduced loading and speeding up of blower motor 61 and fan 59.

A further and important advantage of the present invention is achieved through the introduction of switches GBA and GBB into the circuit in such manner that, while the operation of carriage motor 30 and hoist motor 38 is arrested when either switch is actuated by its associated guide bar 41 or 42, blower motor 61 is not affected thereby. This is also the case with respect to switch SCS which is actuated whenever excessive movement of the slack take-up arm 87 associated therewith occurs. As was previously indicated, the three switches SCS, GBA and GBB are in series with interlock relay IR whose contacts IR–2 are in series with the auxiliary control relays RDX, RUX, RFX and RRX.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. Apparatus for grasping and shifting articles by means of suction, comprising a support, a carriage movable from one position to another position along said support, elongated guide means depending from said carriage, means movably connecting said elongated guide means to said carriage whereby said guide means is movable with said carriage and movable to a limited extent relative to said carriage, a first motor means for moving said carriage back and forth between said positions, suction grasping means including a header member, means suspending said suction grasping means below said carriage and including a second motor means supported on said carriage and a cable connected to said second motor means and said header member for raising and lowering the latter relative to said carriage and along said elongated guide means, means extending between said header member and said elongated guiding means whereby said guide means is moved relative to said carriage upon the occurrence of predetermined malfunctions of said suction grasping means, circuit means for connecting said first and second motor means and said suction grasping means to a source of electromotive power and controlling operation thereof in a predetermined sequence, and said circuit means including control means responsive to movement of said elongated guide means relative to said carriage for interrupting operation of said first and second motor means but ineffective with respect to said suction grasping means.

2. An apparatus for grasping and shifting articles by means of suction, comprising a support, a carriage movable from one position to another position along said support, an elongated guide bar depending from said carriage, a connector movably seated on said carriage and connected to said guide bar, resilient means biasing said connector toward said carriage and normally maintaining said connector and said guide bar in a predetermined position relative to said carriage with said guide bar movable with and relative to said carriage, a first motor means for moving said carriage back and forth between said positions, suction grasping means including a header member, means suspending said suction grasping means below said carriage and including a second motor means supported on said carriage and a cable connected to said second motor means and said header member for raising and lowering the latter relative to said carriage and along said guide bar, a guide bracket connected to said header member and slideably engaging said guide bar, predetermined movements of said header member being transmitted through said guide bracket to said guide bar to move the latter relative to said carriage, circuit means for connecting said first and second motor means and said suction grasping means to a source of electromotive power and controlling operation thereof in a predetermined sequence, and said circuit means including control means responsive to movement of said guide bar relative to said carriage for interrupting operation of said first and second motor means but ineffective with respect to said suction grasping means.

3. An apparatus for grasping and shifting articles by means of suction, comprising a support, a carriage movable from one position to another position along said support, a pair of elongated guide bars depending from said carriage, a connector movably seated on said carriage and connected to said guide bars adjacent to one end thereof, resilient means biasing said connector toward said carriage and normally maintaining said connector and said guide bars in a predetermined position relative to said carriage, said guide bars extending in parallel spaced relation and being movable relative to said carriage against said resilient means as well as movable with said carriage, a first motor means for moving said carriage back and forth between said positions, suction grasping means including a header member, means suspending said suction grasping means below said carriage and including a second motor means supported on said carriage and a cable connected to said second motor means and said header member for raising and lowering the latter relative to said carriage and along said guide bars, a pair of guide brackets connected to said header member each slideably engaging one of said guide bars, predetermined movements of said header member being transmitted through said guide brackets to said guide bars to move the latter relative to said carriage, circuit means for connecting said first and second motor means and said suction grasping means to a source of electromotive power and controlling operation thereof in a predetermined sequence, and said circuit means including control means responsive to movement of said guide bars relative to said carriage for interrupting operation of said first and second motor means but ineffective with respect to said suction grasping means.

4. Apparatus for grasping and shifting articles by means of suction, comprising a support, a carriage movable along said support from one position to another position, elongated guide means depending from said carriage, means movably connecting said elongated guide means to said carriage with the guide means movable with the carriage and movable to a limited extent relative to the carriage, a first motor means connected to said carriage for driving the same along said support, a header member, means on said carriage and movable therewith for raising and lowering said header member and including a second motor means and a cable connected thereto and to said header member, suction blower means including a third motor means and a blower communicating through said header member with the area thereunder and having a discharge opening, means for opening and closing said discharge opening and thereby controlling the suction applied under said header member, said header member having a vent opening formed therethrough through which the area under said header member may communicate with the atmosphere thereabove, a normally closed vent valve for opening said vent, means for operating said vent valve, means extending between said header member and said elongated guide means for moving said elongated guide means relative to said carriage upon the occurrence of predetermined malfunctions of said header member, circuit means for connecting all of said motor means, said opening and closing means and said vent valve operating means to a source of electromotive power and controlling operation thereof in a predetermined sequence, and said circuit means including control means responsive to movement of said elongated guide means relative to said carriage for interrupting operation of said first and second motor means but ineffective with respect to said third motor means, opening and closing means and said vent valve operating means.

5. An apparatus as set forth in claim 4, comprising a slack take-up member movably mounted on said carriage and engaging said cable, means biasing said slack take-up member against said cable whereby said slack take-up member and cable are displaced to take up slack in said cable, and said circuit means control means being responsive to a predetermined movement of said slack take-up member for interrupting operation of said first and second motor means.

6. Apparatus for grasping and shifting articles by means of suction, comprising a support, a carriage movable along said support, a first motor means connected to said carriage for driving the same along said support, a header member, means on said carriage and movable therewith for raising and lowering said header member and including a second motor means and a cable connected thereto and to said header member, suction blower means including a third motor means and a blower communicating through said header member with the area thereunder and having a discharge opening, a valve shiftably connected to said blower for opening and closing said discharge opening and thereby controlling the suction applied under said header member, resilient means connected to said valve and for maintaining the same at rest in each of its open and closed positions, means for operating said valve to open and close said discharge opening, said header member having a vent opening formed therein through which the area under said header member may communicate with the atmosphere thereabove, a normally closed vent valve closing said vent opening, means for operating said vent valve, and electric circuit means for connecting all of said motor means and said valve and vent valve operating means to a source of electromotive power and controlling operation thereof in a predetermined sequence.

7. Apparatus for grasping and shifting articles by means of suction as set forth in claim 6 and further comprising a first switch mounted on said header member, means for actuating said first switch including an elongated actuator bar extending along and pivotally connected adjacent one end thereof to the under surface of said header member and a rod connected to said actuator member and extending upwardly through an opening formed in said header member adjacent to said first switch whereby said actuator bar engages articles to be grasped and is moved thereby relative to said header member with said rod partaking of the motion of said actuator bar to actuate said first switch, and said electric circuit means further includes means responsive to said first switch for stopping downward motion of said header member and actuating said valve operating means to open said discharge opening.

8. Apparatus for grasping and shifting articles by means of suction as set forth in claim 7 and further comprising a collapsible member mounted on said header member and with the interior thereof communicating with the atmosphere under said header member, said collapsible member being adapted to collapse when a predetermined pressure differential is formed between its interior and the external atmosphere, a second switch mounted on said header member adjacent to said collapsible member, means for actuating said second switch in response to collapse of said collapsible member, and said circuit means including means responsive to said second switch for initiating operation of said second motor means to raise said header member.

9. Apparatus for grasping and shifting articles by means of suction, comprising a support, a carriage movable along said support, first switch means responsive to said carriage at predetermined positions along said support, elongated guide means, means movably connecting said elongated guide means to said carriage with said elongated guide means normally depending vertically from the carriage in predetermined relation thereto for both vertically movable and laterally swingable relative to its normal position, second switch means responsive to displacement of said elongated guide means from its normal position relative to said carriage, a first motor means for moving said carriage back and forth along said support, a header member, means on said carriage for raising and lowering said header member along said elongated guide means and including a second motor means and a cable connected thereto and to said header member, resiliently biased means on said carriage for engaging said cable and maintaining the same taut, third switch means responsive to predetermined displacement of said resiliently biased means, article finding means movably connected to and extending downward from and for a substantial distance along the under surface of said header member, fourth switch means responsive to movement of said article finding means, suction means including a third motor means and an air pumping means communicating through said header member with the area thereunder and having a discharge opening, resiliently biased valve means for opening and closing said discharge opening and including a valve resiliently biased in both its open and closed positions, pressure responsive means mounted on said header member in communication with the atmosphere under said header member and movable in response to a predetermined pressure differential thereacross, fifth switch means responsive to said pressure responsive means, and electric circuit means responsive to actuation of said first, third, fourth and fifth switch means for controlling operation of said first and second motor means and said resiliently biased valve means in predetermined sequence, said electric circuit means being responsive to said second switch means for rendering said first and second motor means ineffective upon displacement of said elongated guide means from its normal position.

10. Apparatus for grasping and shifting articles by means of suction, comprising a support, a carriage movable from one position to another position along said support, means for moving said carriage back and forth between said positions, suction grasping means including a header member, means suspending said suction grasping means below said carriage and including motor means supported by said carriage and a cable connected to said motor means and said header member for raising and lowering the latter relative to said carriage, means for vertically guiding said header member at each of said positions and including guide means movable with said carriage and movable to a limited extent relative to said carriage upon the occurrence of predetermined malfunctions of said suction grasping means, circuit means for controlling operation of said carriage moving means, said motor means and said suction grasping means in a predetermined sequence, and said circuit means including control means responsive to movement of said guide means relative to said carriage for interrupting operation of said carriage moving means and said motor means but ineffective with respect to said suction grasping means.

11. Apparatus for grasping and shifting articles by means of suction, comprising a support, a carriage movable along said support, means for driving said carriage along said support, a header member, means on said carriage and movable therewith for raising and lowering said header member and including first motor means and a cable connected thereto and to said header member, suction blower means including a second motor means and a blower communicating with the area under said header member and having an opening, a valve shiftably mounted for opening and closing said opening and thereby controlling the suction applied under said header member, means for operating said valve to open and close said opening and for maintaining said valve at rest in its said positions, said suction grasping means having a vent opening formed therein communicating with the area under said header member, a vent valve for closing said vent opening, means for operating said vent valve, and electric circuit means for controlling in a predetermined sequence operation of said carriage moving means, said motor means and said valve and vent valve operating means.

12. Apparatus for grasping and shifting articles by means of suction as set forth in claim 11 and further comprising article finding means movably connected to and extending downward from and for a substantial distance along the under surface of said header member, first switch means responsive to movement of said article finding means, whereby said article finding means engages articles to be grasped and is moved thereby relative to said header member and actuates said first switch means, and said electric circuit means further including means responsive to said first switch for stopping downward motion of said header member and actuating said valve operating means to open said blower opening.

13. Apparatus for grasping and shifting articles by means of suction as set forth in claim 12 and further comprising a second switch means, means responsive to a predetermined pressure differential between the area under said header member and the external atmosphere and for actuating said second switch means, and said circuit means including means responsive to said second switch means for initiating operation of said first motor means to raise said header member.

14. Apparatus for grasping and shifting articles by means of suction, comprising a support, a carriage movable from one position to another position along said support, means for moving said carriage back and forth between said positions, suction grasping means including a header member, means suspending said suction grasping means below said carriage and including first motor means supported by said carriage and a cable connected to said motor means and said header member for raising and lowering the latter relative to said carriage, means for vertically guiding said header member at each of said positions and including guide means movable with said carriage and movable to a limited extent relative to said carriage, suction blower means including a second motor means and a blower communicating with the area under said header member and having an opening, a valve shiftably mounted for opening and closing said opening and thereby controlling the suction applied under said header member, means for operating said valve to open and close said opening and for maintaining said valve at rest in its said positions, and electric circuit means for controlling operation of said carriage moving means, all of said motor means and said valve operating means in a predetermined sequence.

References Cited in the file of this patent

UNITED STATES PATENTS 2,716,497 Wahl et al. ---------------- Aug. 30, 1955